(12) United States Patent
Kazmi

(10) Patent No.: US 8,774,126 B2
(45) Date of Patent: Jul. 8, 2014

(54) TIME-ALIGNMENT AT HANDOVER

(75) Inventor: Muhammad Ali Kazmi, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 612 days.

(21) Appl. No.: 12/665,979

(22) PCT Filed: Jan. 3, 2008

(86) PCT No.: PCT/SE2008/050007
§ 371 (c)(1),
(2), (4) Date: Dec. 22, 2009

(87) PCT Pub. No.: WO2009/002248
PCT Pub. Date: Dec. 31, 2008

(65) Prior Publication Data
US 2011/0007707 A1 Jan. 13, 2011

Related U.S. Application Data

(60) Provisional application No. 60/946,055, filed on Jun. 25, 2007.

(51) Int. Cl.
*H04W 4/00* (2009.01)

(52) U.S. Cl.
USPC ........... 370/331; 310/310; 310/328; 310/329; 455/436; 455/437; 455/438; 455/440; 455/441

(58) Field of Classification Search
None
See application file for complete search history.

(56) References Cited

U.S. PATENT DOCUMENTS

2001/0021179 A1* 9/2001 Tiedemann et al. .......... 370/333
2001/0030949 A1* 10/2001 Molno et al. .................. 370/329

(Continued)

FOREIGN PATENT DOCUMENTS

| JP | 2002538699 A | 12/2002 |
|----|----|----|
| JP | 2004506392 A | 2/2004 |
| JP | 2005124215 A | 5/2005 |
| JP | 2007522759 A | 8/2007 |
| WO | 0051393 A1 | 8/2000 |

OTHER PUBLICATIONS

Interdigital, "Minimizing the Timing Advance Procedure Requirement During LTE Handover.", 3GPP TSG RAN2 #58, May 7-11, 2007, pp. 1-11, Kobe, JP, R2-071622.

(Continued)

*Primary Examiner* — Hassan Phillips
*Assistant Examiner* — Gautam Sharma
(74) *Attorney, Agent, or Firm* — Coats & Bennett, P.L.L.C.

(57) ABSTRACT

Time-aligned handover for a mobile device is described herein. The time-aligned handover is achieved by determining a time difference between serving and target cells and determining a target propagation delay based on the time difference. In some cases, the target propagation delay may further be determined based on a serving propagation delay between the serving cell and the mobile device. A target transmission time is calculated based on the target propagation delay. The mobile device uses the target transmission time to time align transmissions to the target cell during handover.

6 Claims, 3 Drawing Sheets

(56) References Cited

U.S. PATENT DOCUMENTS

| | | | |
|---|---|---|---|
| 2004/0082344 A1* | 4/2004 | Moilanen et al. | 455/456.3 |
| 2004/0128095 A1* | 7/2004 | Oestreich | 702/89 |
| 2004/0202119 A1* | 10/2004 | Edge | 370/324 |
| 2005/0143072 A1 | 6/2005 | Yoon et al. | |
| 2005/0192011 A1 | 9/2005 | Hong et al. | |
| 2007/0149206 A1* | 6/2007 | Wang et al. | 455/450 |
| 2007/0293225 A1* | 12/2007 | Kangude et al. | 455/436 |
| 2008/0084849 A1* | 4/2008 | Wang et al. | 370/332 |
| 2008/0182579 A1* | 7/2008 | Wang et al. | 455/436 |
| 2008/0225796 A1* | 9/2008 | Malladi et al. | 370/331 |
| 2008/0267127 A1* | 10/2008 | Narasimha et al. | 370/331 |
| 2008/0267131 A1* | 10/2008 | Kangude et al. | 370/331 |
| 2008/0318578 A1* | 12/2008 | Worrall | 455/437 |

OTHER PUBLICATIONS

3rd Generation Partnership Project. "Minimizing the Non-Synchronized RACH Procedure Requirement during LTE Handover." 3GPP TSG RAN1 #47bis, R1-070163, Sorrento, Italy, Jan. 15-19, 2007.

3rd Generation Partnership Project. 3GPP TR 25.813 V7.1.0 (Sep. 2006). 3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects (Release 7). Sep. 2006.

* cited by examiner

TIME-ALIGNMENT AT HANDOVER

TECHNICAL FIELD

The present invention relates generally to handover of a mobile device from a serving cell to a target cell in a wireless communication network, and particularly to performing time-aligned handover of the mobile device.

BACKGROUND

It is important that wireless signals transmitted by a mobile device arrive at a base station or access point during a predetermined reception window corresponding to the base station's frame timing. Without proper alignment with the reception window, the mobile device's transmissions may interfere with signals in an adjacent time frame, sub-frame, or time slot. Furthermore, improper time alignment at handover may cause the signals to arrive outside the base station's reception window. To capture the desired signals from the mobile device at the base station, a much longer reception window will have to be implemented. Longer reception window increases complexity of the receiver at the base station since they require more hardware and processing ability. Due to the mobility of the mobile device, the distance between a base station and the mobile device varies. This in turn varies the propagation delay between the base station and the mobile device. Thus, to ensure that a mobile device's transmissions arrive at the base station within the correct reception window, the network may regularly monitor the propagation delay of the mobile device, and signal the appropriate time offset or transmission time corresponding to the propagation delay to the mobile device. The mobile device uses the received offset or transmission time such that its transmissions arrive at the base station at a desired time.

During a handover of the mobile device from a serving cell to a target cell, the mobile device needs to adjust its transmit timing to account for differences in the propagation delay from the mobile device to the target cell and the serving cell. The failure to make the timing adjustment may produce interference and/or prolong synchronization and handover. For example, during handover in LTE networks, the mobile device uses a random access procedure to access the target base station and acquire physical layer synchronization with the target base station. If the mobile device accesses the target base station during handover at a transmission time that does not match up with the frame timing of the target base station, the handover signals received at the target base station may interfere with adjacent slots/frames, may cause a high load on a Random Access Channel (RACH) due to retransmission(s), and/or may cause longer handover interruptions due to longer synchronization times. The RACH is also used by mobile devices for initial access, and therefore, excessive RACH retransmissions at handover may increase RACH load and collisions. Thus, at high loads there is risk that if transmission timing is not adjusted, the RACH transmission may become unstable.

One potential solution to match the mobile device transmission time with the desired target cell frame timing is to determine and apply a propagation-related offset to the mobile device's transmission time during handover. For example, the target base station may calculate the uplink propagation delay relative to the mobile device and signal the corresponding offset to the mobile device. Based on the received offset, the mobile device adjusts (e.g., advances) its next transmission time. This approach, however, may delay uplink synchronization, especially in large cells. In LTE, where handover access takes place on the RACH, the mobile device's initial transmission to the target base station on the RACH is not compensated for the propagation delay offset relative to the target base station, and thus may cause a high load on the RACH and eventually long handover interruption times.

Another potential solution is to estimate the propagation-related offset at the target base station before handover. In this case, the target base station transmits a reference signal to the mobile device before handover, and the mobile device transmits a response. Based on the response, the target base station measures the propagation delay and communicates the corresponding offset to the serving base station, which in turn signals the offset to the mobile device before the handover begins, e.g., via a handover command. The advantage of this solution is that the mobile device has proper timing relative to the target base station during handover. However, this solution requires some timing estimation at the target base station before handover. Further, signaling the offset undesirably imposes signaling overhead on the transport network between the serving and target base stations.

Thus, there remains a need for alternative methods for aligning signal transmissions between a mobile device and a target base station during handover.

SUMMARY

The present invention performs time-aligned handover of a mobile device using a target propagation delay determined based on a time difference between serving and target cells. More particularly, the target propagation delay between the mobile device and the target cell is determined based on the time difference. Subsequently, a target transmission time is calculated based on the target propagation delay. The target transmission time may comprise a relative target transmission time, such as a time advance, or may comprise an absolute target transmission time. In either case, the mobile device controls the timing of signals transmitted to a target access point in the target cell based on the target transmission time. In other words, the relative or absolute target transmission time represents the transmission time that defines when the mobile device transmits to the target access point.

In one embodiment, a serving access point in the serving cell calculates the target transmission time using a target propagation delay determined based on a time difference provided by the mobile device. The serving access point transmits the calculated target transmission time to the mobile device for use by the mobile device in performing time-aligned handover.

In another embodiment, the mobile device calculates the target transmission time. For example, the mobile device may measure first and second reception times corresponding to different signals received from the respective serving and target cells, and may calculate the time difference based on the first and second reception times. Using the calculated time difference and a serving propagation delay provided to the mobile device by the serving access point, the mobile device may determine the target propagation delay used to calculate the target transmission time. In addition or alternatively, the mobile device may autonomously determine the target transmission time.

In either case, the present invention provides time-aligned handover that reduces interference in adjacent slots/frames, reduces the load and/or collisions on a RACH, and/or reduces the time required for handover by reducing the time required for physical layer synchronization. Further, the present invention reduces signaling overhead between the serving and target APs.

DETAILED DESCRIPTION

Figure 1:
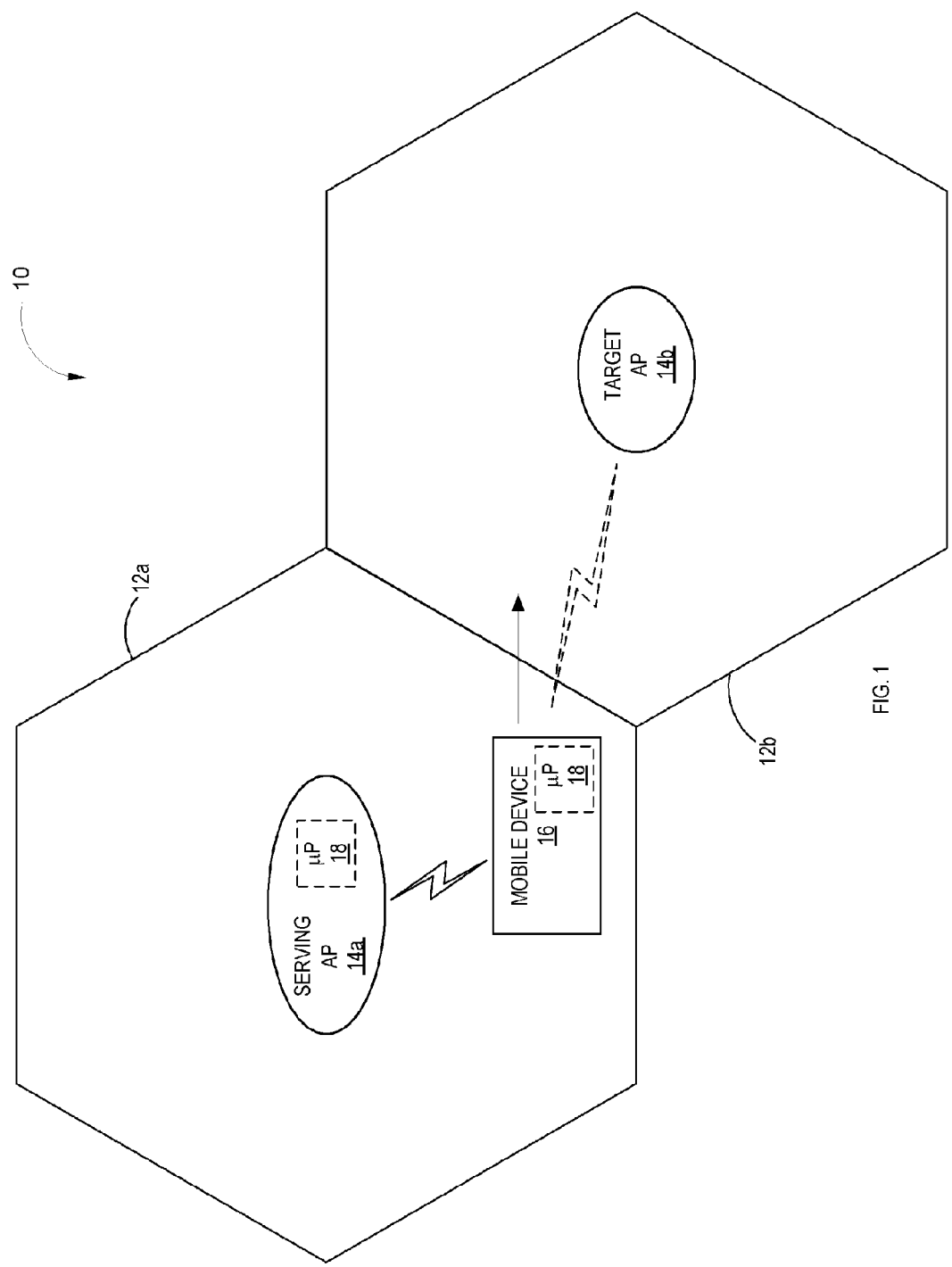
FIG. 1 shows an exemplary wireless network according to the present invention.

FIG. 1 shows an exemplary wireless network 10 involved in a mobile-assisted handover. The illustrated network 10 generally applies to, but is not limited to, WCDMA and LTE networks. The network 10 includes multiple cells 12, were each cell 12 includes one or more base stations or access points (AP) 14. A mobile device 16 served by a serving AP 14a in a serving cell 12a may move in a direction toward a neighboring AP 14b in a neighboring cell 12b, respectively referred to herein as the target AP 14b and target cell 12b. While transmitting data within the serving cell 12a, mobile device 16 measures the strength of signals received from the serving AP 14a and the target AP 14b. Based on the signal strength measurements, the network 10 and/or the mobile device 16 determines when to do handover control of the mobile device 16 to the target AP 14b in the target cell 12b and triggers the handover accordingly.

It is important that wireless signals transmitted by the mobile device 16 during handover arrive at the target AP 14b during a predetermined reception window. Without proper alignment with the reception window, the transmissions may interfere with signals in an adjacent time frame, sub-frame, or time slot. In addition, if the signals arrive outside the reception window, the target AP 14b may have to implement a longer reception window to search for signals. Longer reception windows require more hardware and processing ability, and therefore, increase the complexity of a receiver at the AP 14. Further, improper time alignment may prolong the handover process. The present invention time-aligns a mobile device's transmissions with the frame timing of the target cell 12b to time-align the handover. To that end, the mobile device 16 or serving access point 14a determines a target propagation delay between the mobile device 16 and the target cell 12b before handover, and time-aligns the handover based on the determined target propagation delay.

Figure 2:
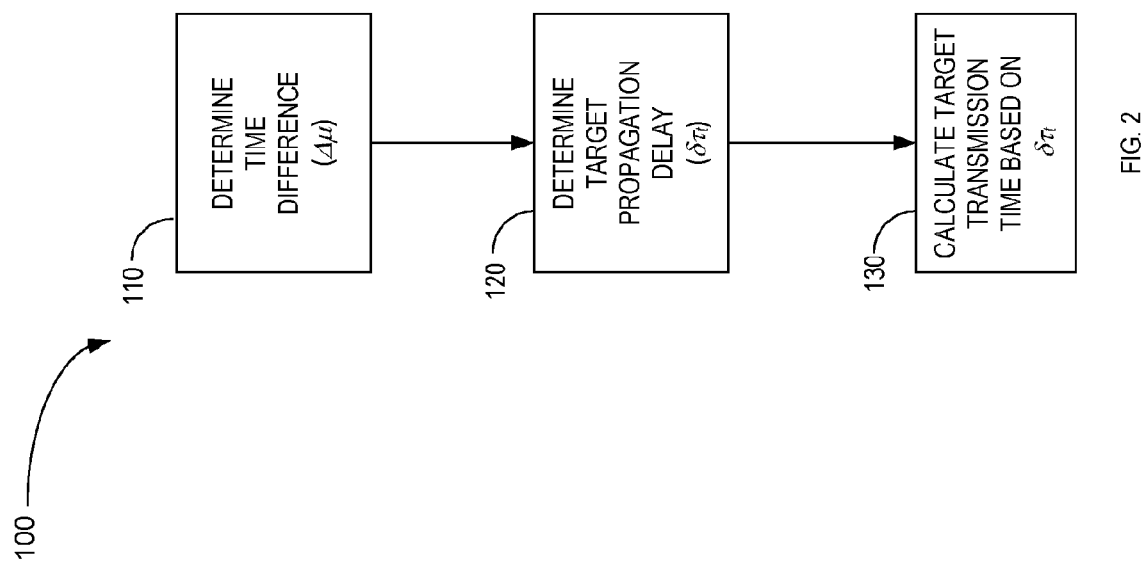
FIG. 2 shows an exemplary process for time-aligning handover according to the present invention.

FIG. 2 shows one exemplary process 100 for time-aligning the handover between a mobile device 16 and a target AP 14b in a target cell 12b. A time difference ($\Delta\mu$) is determined between the serving and target cells 12 (block 110). The time difference $\Delta\mu$ represents a propagation time difference resulting from the difference between the distance separating the mobile device 16 and the target AP 14b and the distance separating the mobile device 16 and the serving AP 14a. Based on the time difference $\Delta\mu$, a target propagation delay ($\delta\tau_t$) is determined (block 120). The target propagation delay $\delta\tau_t$ represents the propagation time delay between when a signal is transmitted from the mobile device 16 and received by the target AP 14b. Subsequently, either a relative or absolute target transmission time is calculated based on the target propagation delay $\delta\tau_t$ (block 130). For example, a relative target transmission time may comprise a transmission time advance corresponding to the target propagation delay $\delta\tau_t$. An absolute target transmission time may comprise a target transmission time for the mobile device 16 that is calculated based on the target propagation delay $\delta\tau_t$ and other frame timing parameters corresponding to the target cell 12b. The mobile device 16 uses the calculated target transmission time to time-align signal transmissions with the target cell's frame timing during handover.

When the frame timings of the serving and target cells 12 are not synchronized, the target propagation delay $\delta\tau_t$ may be determined according to:

$$\delta\tau_t = \Gamma_s + \delta\tau_s - \Gamma_t - \Delta\mu, \quad (1)$$

where $\delta\tau_s$ represents the serving propagation delay between the mobile device 16 and the serving cell 12a, $\Gamma_s$ represents the absolute frame timing of the serving cell 12a, and $\Gamma_t$ represents the absolute frame timing of the target cell 12b. When the frame timings of the serving and target cells are synchronized, $\Gamma_s = \Gamma_t$, and Equation (1) may be reduced to:

$$\delta\tau_t = \delta\tau_s - \Delta\mu. \quad (2)$$

In one embodiment, a processor 18 in the serving AP 14a implements the process 100 shown in FIG. 2. For this embodiment, processor 18 may determine the time difference $\Delta\mu$ by receiving the time difference $\Delta\mu$ from the mobile device 16. Alternatively, the processor 18 may calculate the time difference $\Delta\mu$ based on known locations of the serving and target APs 14 or may receive the time difference $\Delta\mu$ from a network control entity (not shown). When the time difference $\Delta\mu$ is received from the mobile device 16, the processor 18 in the mobile device 16 measures a serving reception time for a signal (e.g., a signal on a Common Pilot Indication Channel (CPICH) or a Physical Common Control Physical Channel (P-CCPCH) in a UTRAN system) received from the serving cell 12a, and measures a target cell reception time for a signal (e.g., a signal on a CPICH or a P-CCPCH in a UTRAN system) received from the target 12b. The processor 18 in the mobile device 16 determines the time difference $\Delta\mu$ based on the difference between the serving and target reception times and reports the time difference $\Delta\mu$ to the serving AP 14a. It will be appreciated that the processor 18 already knows the serving propagation delay $\delta\tau_s$ required for Equations (1) and (2) based on previous communications with the mobile device 16. Further, it will be appreciated that the processor 18 already knows $\Gamma_s$, and may already know $\Gamma_t$ or may obtain $\Gamma_t$ from the target AP 14b or a network control entity (not shown). Thus, processor 18 may calculate the target propagation delay $\delta\tau_t$ according to Equation (1) or Equation (2), and may calculate the target transmission time based on the target propagation delay $\delta\tau_t$. The processor 18 transmits the calculated target transmission time to the mobile device 16 using any known means. For example, processor 18 may transmit the target transmission time to the mobile device 16 as part of a handover command.

Figure 3:
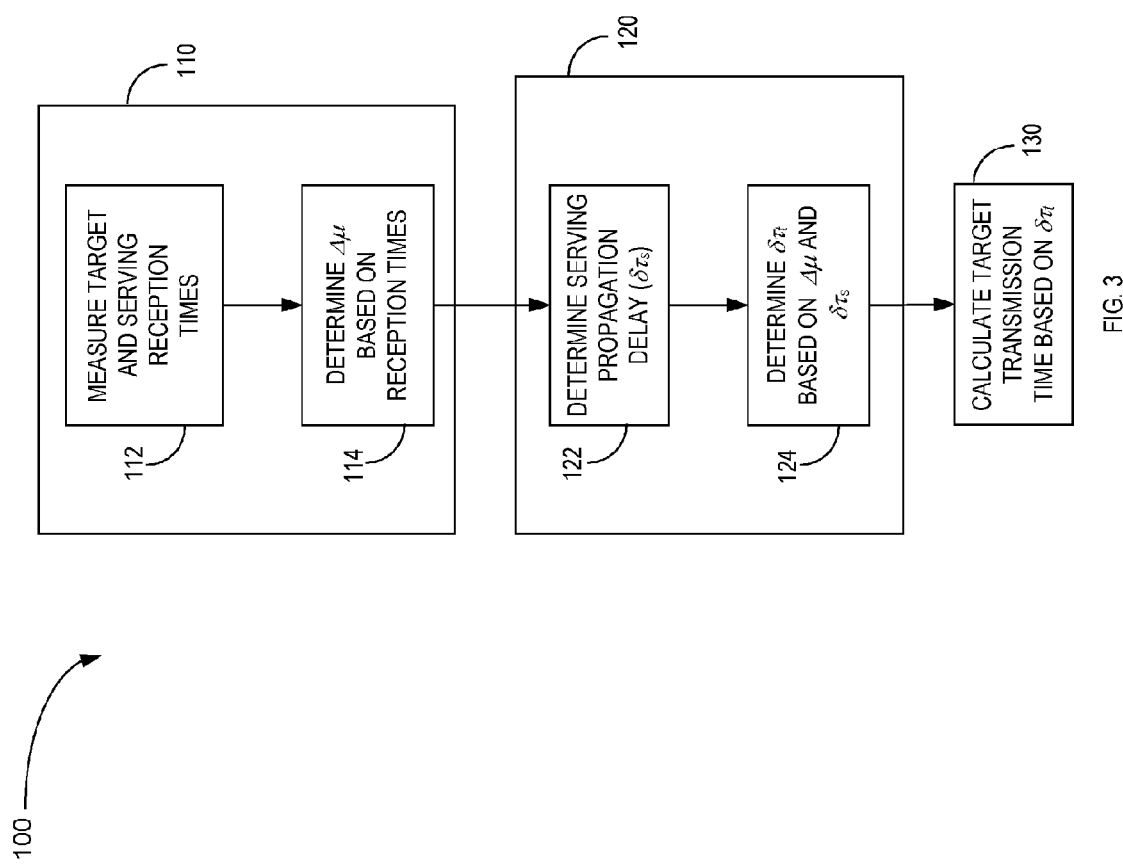
FIG. 3 shows another exemplary process for time-aligning handover according to the present invention.

In another embodiment, a processor 18 in the mobile device 16 may autonomously implement the process 100, as shown in FIG. 3. For this embodiment, processor 18 determines the time difference $\Delta\mu$(block 110) based on reception time measurements associated with signals received from the serving and target cells 12. More particularly, processor 18 measures the serving reception time for a signal (e.g., a signal on a CPICH or a P-CCPCH in a UTRAN system) received from the serving cell 12a, and measures the target reception time for a signal (e.g., a signal on a CPICH or a P-CCPCH in a UTRAN system) received from the target cell 12b (block 112). The processor 18 determines the time difference $\Delta\mu$ based on the difference between the serving and target reception times (block 114). It will be appreciated that the signals used to determine the time difference at the mobile device 16 may be the same signals used to determine when handover is required.

Processor 18 in the mobile device 16 determines the target propagation delay $\delta\tau_t$ (block 120) by first determining the serving propagation delay $\delta\tau_s$ (block 122). The processor 18 may, for example, measure a round trip delay corresponding to an echo of a signal transmitted by the mobile device 16 and determine the serving propagation delay $\delta\tau_s$ based on the round trip delay. Processor 18 uses the serving propagation delay $\delta\tau_s$ and the time difference $\Delta\mu$ determined autonomously by the processor 18 to determine the target propagation delay $\delta\tau_t$ (block 124), which is then used to determine the target transmission time (block 130). The mobile device uses calculated target transmission time to control when signals are transmitted to the target AP 14b during handover. The process where the mobile device 16 autonomously determines target transmission time is realizable provided the serving cell 12a employs a fixed timing relation between the uplink received signal from the mobile device 16 and the downlink transmitted signal to the mobile device 16.

Alternatively, the processor 18 in the mobile device 16 may implement the process 100 jointly with information provided by the serving cell 12a. For example, processor 18 may determine the time difference $\Delta\mu$ (block 110) based on reception time measurements associated with signals received from the serving and target cells 12, as shown in blocks 112 and 114 of FIG. 3. After receiving the serving propagation delay $\delta\tau_s$ from the serving AP 14a, processor 18 determines the target propagation delay $\delta\tau_t$ based on the received serving propagation delay $\delta\tau_s$ and the calculated time difference $\Delta\mu$ (block 120). If Equation (1) is used to determine the target propagation delay $\delta\tau_t$, the processor 18 may further receive the absolute serving and target transmission times ($\Gamma_s$ and $\Gamma_s$, respectively) from the serving cell 12a.

The present invention provides several advantages over prior art solutions. First, the target transmission time is calculated based on already existing, and therefore readily available, timing measurements, e.g., the reception times corresponding to the signal strength measurements that may be used to determine the time difference $\Delta\mu$ and the serving propagation delay $\delta\tau_s$ known by the serving AP 14a. Second, the present invention eliminates the need for the target AP 14b to perform any timing measurements, and therefore, reduces signaling overhead on the transport network between the serving and target APs 14. Further, the preset invention enables the mobile device 16 to enter handover with the target cell 12b with the correct timing, which reduces interference in adjacent slots, sub-frames, or frames. Entering handover with the correct timing further reduces the time required for physical layer synchronization, which reduces the time required for handover. In addition, entering handover with the correct timing reduces collisions on random access channels used by the LTE to implement handover. Furthermore, the present invention reduces the reception window of the target AP 14b, and therefore, reduces the complexity and cost of a receiver at the target AP 14b.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of performing time-aligned handover of a mobile device between serving and target cells in a wireless communication network, the method executed at a serving access point in the serving cell and comprising:
    determining, at the serving access point, a time difference between the serving and target cells;
    determining, at the serving access point, a target propagation delay between the mobile device and the target cell based on the determined time difference;
    calculating, at the serving access point, a target transmission time towards the mobile device after handover by adding an offset value corresponding to the determined target propagation delay to a transmission time of the target cell; and
    transmitting the target transmission time from the serving access point to the mobile device for use by the mobile device in performing time-aligned handover,
    wherein determining the target propagation delay comprises calculating the propagation delay based on the time difference and a serving propagation delay between the mobile device and the serving cell according to $\delta\tau_t = \delta\tau_s - \Delta\mu$, where $\delta\tau_t$ represents the target propagation delay between the mobile device and the target cell, $\delta\tau_s$ represents the serving propagation delay between the mobile device and the serving cell, and $\Delta\mu$ represents the time difference.

2. The method of claim 1 wherein determining the time difference comprises receiving the time difference at the serving access point from the mobile device.

3. A serving access point of a serving cell for performing time-aligned handover of a mobile device between the serving cell and a target cell in a wireless communication network, the serving access point comprising:
    a processor circuit configured to:
        determine a time difference between the serving and target cells;
        determine a target propagation delay between the mobile device and the target cell based on the determined time difference;
        calculate a target transmission time by adding an offset value corresponding to the determined target propagation delay to a transmission time of the target cell; and
    transmit the target transmission time to the mobile device for use by the mobile device in performing time-aligned handover,
    wherein the processor circuit is configured to determine the target propagation delay by calculating the propagation delay based on the time difference and a serving propagation delay between the mobile device and the serving cell according to $\delta\tau_t = \delta\tau_s - \Delta\mu$, where $\delta\tau_t$ represents the target propagation delay between the mobile device and the target cell, $\delta\tau_s$ represents the serving propagation delay between the mobile device and the serving cell, and $\Delta\mu$ represents the time difference.

4. The serving access point of claim 3 wherein the processor circuit is configured to receive the time difference from the mobile device.

5. A method of performing time-aligned handover of a mobile device between serving and target cells in a wireless communication network, the method executed at a serving access point in the serving cell and comprising:
    determining, at the serving access point, a time difference between the serving and target cells;
    determining, at the serving access point, a target propagation delay between the mobile device and the target cell based on the determined time difference;
    calculating, at the serving access point, a target transmission time towards the mobile device after handover by adding an offset value corresponding to the determined target propagation delay to a transmission time of the target cell; and transmitting the target transmission time from the serving access point to the mobile device for use by the mobile device in performing time-aligned handover, wherein determining the target propagation delay comprises calculating the target propagation delay based on the time difference, a serving propagation delay between the mobile device and the serving cell, and absolute transmission times corresponding to the serving and target cells according to $\delta\tau_t = \Gamma_s + \delta\tau_s - \Gamma_t - \Delta\mu$, where $\delta\tau_t$ represents the target propagation delay between the mobile device and the target cell, $\delta\tau_s$ represents the serving propagation delay between the mobile device and the serving cell, $\Delta\mu$ represents the time difference, $\Gamma_s$ represents the absolute transmission time corresponding to the serving cell, and $\Gamma_t$ represents the absolute transmission time corresponding to the target cell.

6. A serving access point of a serving cell for performing time-aligned handover of a mobile device between the serving cell and a target cell in a wireless communication network, the serving access point comprising:

a processor circuit configured to:

determine a time difference between the serving and target cells;

determine a target propagation delay between the mobile device and the target cell based on the determined time difference;

calculate a target transmission time by adding an offset value corresponding to the determined target propagation delay to a transmission time of the target cell; and transmit the target transmission time to the mobile device for use by the mobile device in performing time-aligned handover, wherein the processor circuit is configured to determine the target propagation delay by calculating the target propagation delay based on the time difference, a serving propagation delay between the mobile device and the serving cell, and absolute transmission times corresponding to the serving and target cells according to $\delta\tau_t = \Gamma_s + \delta\tau_s - \Gamma_t - \Delta\mu$, where $\delta\tau_t$ represents the target propagation delay between the mobile device and the target cell, $\delta\tau_s$ represents the serving propagation delay between the mobile device and the serving cell, $\Delta\mu$ represents the time difference, $\Gamma_s$ represents the absolute transmission time corresponding to the serving cell, and $\Gamma_t$ represents the absolute transmission time corresponding to the target cell.

* * * * *